(12) United States Patent
Stone

(10) Patent No.: US 7,570,611 B2
(45) Date of Patent: Aug. 4, 2009

(54) PARALLEL PROCESSING DATA TRANSFER ARRANGEMENTS

(75) Inventor: Alan Stone, Morristown, NJ (US)

(73) Assignee: Intel Corporation, Santa Clara, CA (US)

( * ) Notice: Subject to any disclaimer, the term of this patent is extended or adjusted under 35 U.S.C. 154(b) by 642 days.

(21) Appl. No.: 11/026,547

(22) Filed: Dec. 30, 2004

(65) Prior Publication Data

US 2006/0146849 A1    Jul. 6, 2006

(51) Int. Cl.
*H04B 7/216* (2006.01)
(52) U.S. Cl. .................. 370/324; 370/395.62; 370/503
(58) Field of Classification Search ........................ None
See application file for complete search history.

(56) References Cited

U.S. PATENT DOCUMENTS

| | | | | |
|---|---|---|---|---|
| 4,916,690 A | * | 4/1990 | Barri | 370/422 |
| 4,992,775 A | * | 2/1991 | Castle et al. | 340/525 |
| 5,394,031 A | * | 2/1995 | Britton et al. | 326/38 |
| 7,260,424 B2 | * | 8/2007 | Schmidt | 455/575.7 |

* cited by examiner

*Primary Examiner*—Robert W Wilson
(74) *Attorney, Agent, or Firm*—Schwegman, Lundberg & Woessner, P.A.

(57) ABSTRACT

A data transfer arrangement may be used in a System on a Chip (SoC). The SoC has a processing element fabric and a logic element fabric. The two fabrics are coupled by a fabric exchange element to transfer data efficiently between the processing element fabric and the logic element fabric to facilitate parallel processing.

10 Claims, 4 Drawing Sheets

PARALLEL PROCESSING DATA TRANSFER ARRANGEMENTS

TECHNICAL FIELD

The present subject matter pertains to parallel processing arrangements and, more particularly, to data transfer among parallel processing arrangements.

BACKGROUND

Modern processing systems are able to handle large amounts of data. The processing system's ability to transmit such data is typically limited.

Often the processing ability of such systems is increased by adding more processors. Sometimes tasks are partitioned among processors. These tasks may be performed by various processors in parallel, that is, via parallel processing among processors or among processor groups.

These processor or processor groups often are required to communicate with one another. In order to effectively communicate, these processors may choose to send data back and forth. If one processor that is executing a task is operating in parallel with another processor, the first processor may have to wait for some information or data before it can perform or execute its task. Data exchange therefore becomes critical to the efficient operation of the processors.

Parallel signal processing is often useful in situations where complex signaling arrangements require fast signal processing and signal conversions that must be performed much faster than software is able to do, for example. This signal processing and conversion may be highly computational in nature.

DETAILED DESCRIPTION

Figure 1:
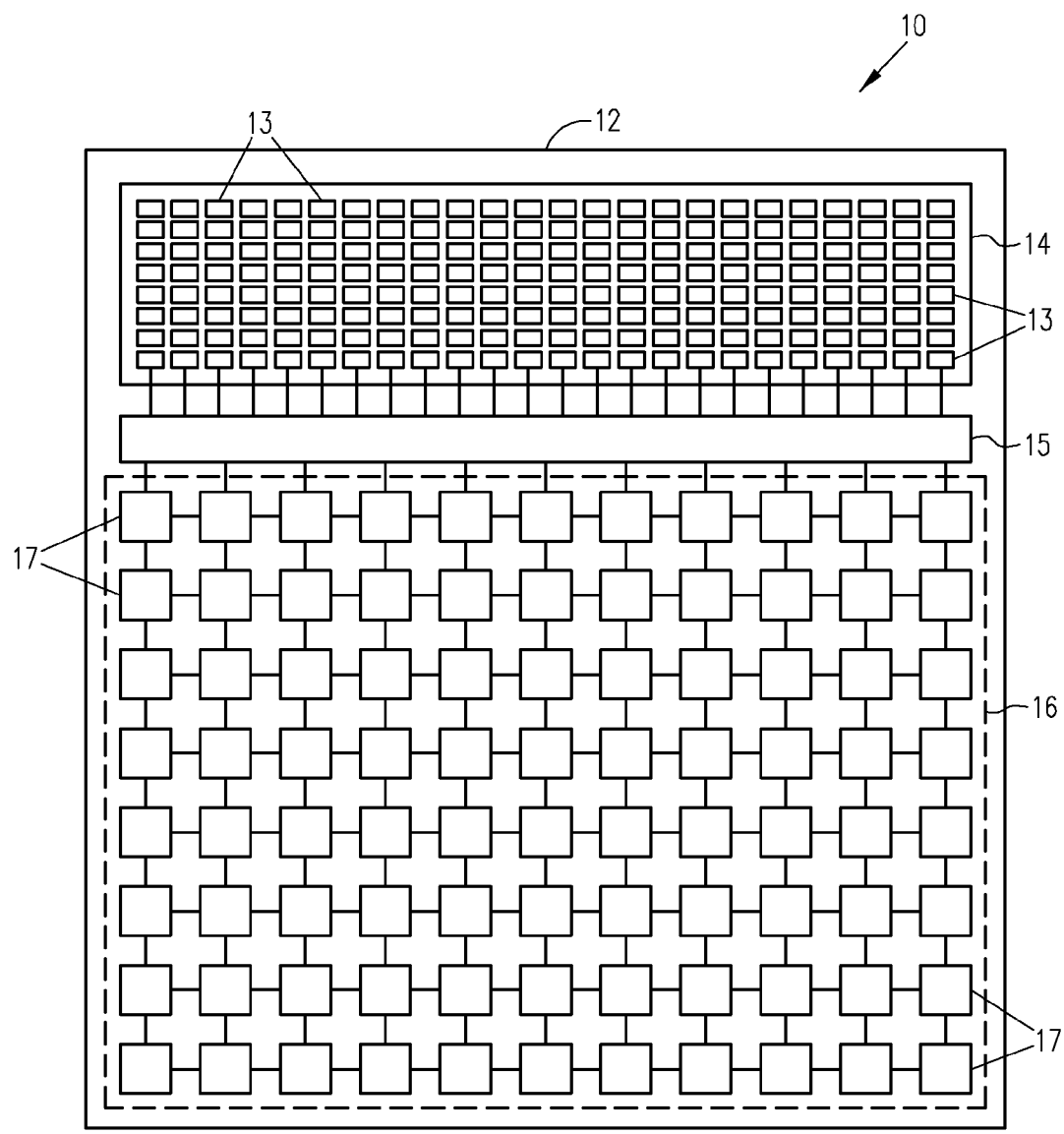
FIG. 1 is a block diagram of a layout of a system on a chip embodying a data transfer arrangement in accordance with an embodiment of the present invention.

FIG. 1 is a block diagram of a layout of a system on a chip (SoC) 10 embodying a data transfer arrangement of the present invention, as an example. SoC 10, for example, includes three structures, an FPGA fabric 14, a parallel processing element (PE) fabric 16 and a fabric exchange element (FEE) 15 coupling the FPGA fabric 14 and the PE fabric 16.

The FPGA fabric 14 may be coupled to an array of macro cells (MCs) 13 of size measuring R×S operating as logic elements, where "R" and "S" are positive integers. This ordering of the macro cells 13 may be an array, as shown in FIG. 1. The FPGA fabric 14 may be an interconnect implementation that provides connectivity in one or more ways between macro cells 13.

The PE fabric 16 may include an array processing elements (PEs) 17 of size measuring K×L, where "K" and "L" are positive integers. The PEs 17 and MCs 13 may exchange data to perform cohesive operations, such as signal processing or signal conversion. The fabric exchange element 15 renders this data transfer or exchange possible. Processing elements 17 may transmit or send data to one or more macro cells 13. Macro cells 13 may also transmit or send data to one or more processing elements 17.

The processing element fabric 16 and each of the PEs 17 may have a clocking arrangement, bus width, layout and topology very different from the MCs 13 of the FPGA fabric 14. The fabric exchange element (FEE) 15 smoothly interfaces the processing element fabric 16 with the FPGA fabric 14. Specifically, the FEE 15 compensates for differing clocking arrangements, bus widths, layout and topology between the PEs 17 and the MCs 13 as may be implemented by each of their respective fabrics 16 and 14.

For example, if the busing arrangement of the MCs 13 is a 4-bit bus and the busing arrangement of the PEs 17 is an 8-bit bus, the FEE 15 separates the 8-bit bus of the PEs into two 4-bit buses in order to exchange or transfer data to achieve compatibility between the two fabrics, in this case the FPGA 13 and processing element 17. Similarly, the FEE 15 may account for different clocking arrangements, accessing arrangements and multiple PE 17 or MC 13 element access by a single MC 13 or PE 17.

As a result, the FEE 15 allows the two fabrics, PEs 17 and MCs 13 to operate independently. Further, the two fabrics may operate asynchronously. The FEE 15 allows any source (PE or MC) node coupled to the FEE 15 to send or transmit data to any destination (MC or PE) node coupled to the FEE 15. Thus exchange of data between the fabrics 14 and 16 is facilitated.

In another embodiment, SoC 10 may comprise a semiconductor device. FPGA fabric 14, FEE 15 and PE fabric 16 may be implemented on one or more semiconductor devices as fabricated by various technologies known to those of ordinary skill in the art. In yet another embodiment, the FPGA fabric 14, FEE 15 and PE fabric 16 may be implemented discretely.

Figure 2:
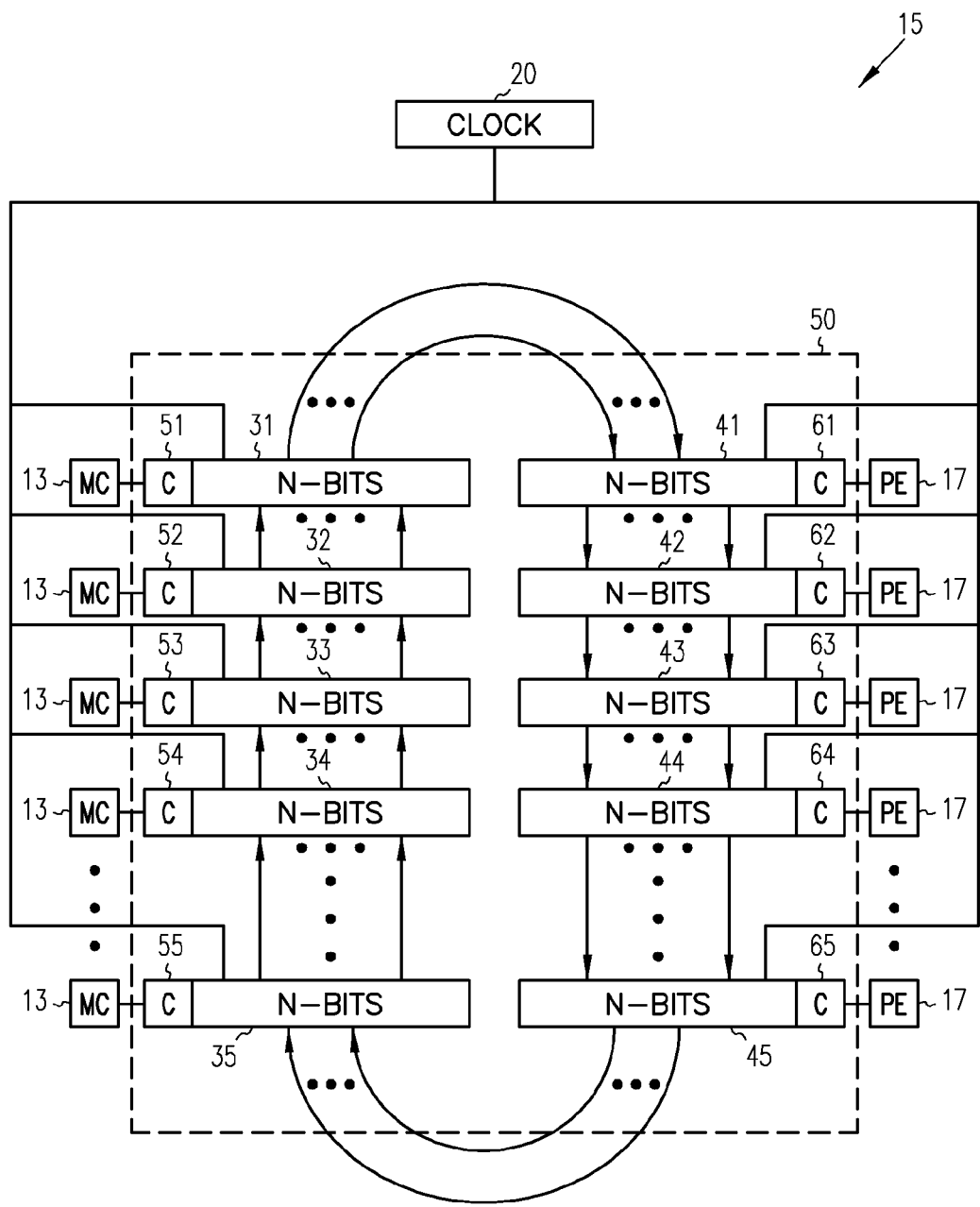
FIG. 2 is a block diagram of an embodiment of a data transfer arrangement depicting the arrangement of the fabric exchange element (FEE) of FIG. 1.

FIG. 2 is a block diagram of an embodiment of a data transfer arrangement depicting the arrangement of the fabric exchange element (FEE) 15 of FIG. 1. FEE 15 may include a clock 20. Clock 20 may be independent of a clock of the FPGA fabric 14 or the PE fabric 16. The clock 20 provides a synchronous clock signal to each shift register 31-35 of the plurality of N-bit registers and to each shift register 41-45 of the plurality of N-bit registers. N-bits indicate that various register widths are within the contemplation of this arrangement. The selection of a specific N is left to a system designer.

N-bit registers 31-35 couple the FPGA fabric 14 to the PE fabric 16 of FIG. 1. Similarly, N-bit registers 41-45 couple the PE fabric 16 to the FPGA fabric 14. More specifically, each N-bit register 31-35 is coupled to an MC 13, and each N-bit register 41-45 is coupled to a PE 17.

Each register 31-35 and 41-45 within the FEE 15 has a C-bit 51-55, 61-65 that indicates when data is available for communicating between each shift register coupled to a PE 17 and each shift register coupled to an MC 13. Circular shift register 50 has a first portion of shift registers (31-35) and a second portion of shift registers (41-45), each shift register coupled in a circular arrangement.

Each N-bit register 31-35 and 41-45 may include a shift register, buffer, FIFO (first-in-first-out) device, a read/write memory device, or any kind of parallel (N-bit) store-and-forward arrangement that may be coupled in a circular fashion.

In an embodiment of the present invention depicted in FIG. 2, registers 31-35 and 41-46 may be shift registers, although as mentioned above other such read/write store-and-forward devices may be utilized. Shift register 35 is coupled N-bits in parallel to shift register 34; shift register 34 is coupled N-bits in parallel to shift register 33; shift register 33 is coupled N-bits in parallel to shift register 32; and shift register 32 is coupled N-bits in parallel to shift register 31. When a clock signal from clock 20 is applied to shift registers 31-35, each shift register transfers in parallel its N-bit wide data to the shift register above it in the flow of the arrows. For example, shift register 32 transfers its data contents to shift register 31. Each of the other shift registers 32-35 performs in a similar manner.

Shift register 41 is coupled N-bits in parallel to shift register 42; shift register 42 is coupled N-bits in parallel to shift register 43; shift register 43 is coupled N-bits in parallel to shift register 44; and shift register 44 is coupled N-bits in parallel to shift register 45. When a clock signal from clock 20 is applied to shift registers 41-45, each shift register transfers in parallel its N-bit wide data to the shift register below it in the flow of the arrows. For example, shift register 41 transfers its data to shift register 42. Each of the other shift registers 42-45 performs in a similar manner.

A limited number of shift registers is shown in FIG. 2, by way of example and not of limitation; however, many more shift registers may be included.

The first shift register 31 in the portion of shift registers 31-35 is coupled N-bits in parallel to the last shift register 41 in another portion of shift registers 41-45. As a result, when clock 20 sends a clock signal to shift register 31, shift register 31 transfers its N-bits of data in parallel to shift register 41. Note that data from the MC 13 to which the shift register 31 is coupled now may be transferred to shift register 41, so that the data can be accessed or read out by a PE 17 to which the shift register 41 is coupled.

The first shift register 45 in the portion of shift registers 41-45 is coupled N-bits in parallel to the last shift register 35 in the other portion of shift registers 31-35. As a result, when clock 20 sends a clock signal to shift register 45, shift register 45 transfers its N-bits of data in parallel to shift register 31 of the other portion of shift registers. Note that data from the PE 17 to which the shift register 45 is coupled may now be transferred to shift register 35, so that the data can be accessed or read out by a MC 13 to which the shift register 35 is coupled.

Shift registers 31-35 and 41-45 may be viewed as a circular shift register of N-bits in width. Additionally, the circular shift register may be viewed as a "wheel" that turns incrementally, thereby moving data from one shift register to another on the "wheel". As the "wheel" turns on each clock cycle, the PE 17 or MC 13 corresponding to a shift register may access or read out the data of its corresponding shift register for use.

Each register 31-35 and 41-45 within the FEE 15 has a C-bit 51-55, 61-65 that indicates when data is available for communicating between each shift register coupled to a PE 17 and each shift register coupled to an MC 13. Each of shift registers 31-35 and 41-45 corresponds to a corresponding C-bit associated with the particular shift register. The C-bit indicates that the loading with data of the corresponding shift register has been completed. Either a PE 17 or an MC 13 will load its corresponding shift register with data, if the PE 17 or MC 13 has data to transfer to one or more of the other MCs 13 or PEs 17.

When the SoC system 10 is initialized, each of the C-bits 51-55 and 61-65 is reset and cleared. Next, each SoC node, whether PE 17 or MC 13, may load its corresponding shift register with data to be transferred to the other portion of the fabric. That is, data may be sent from the FPGA fabric 14 to the PE fabric 16 and vice versa. Some SoC nodes may have data to load into the corresponding shift register, and some may not. In any event, each SoC node that is coupled to the FEE 15 sets the corresponding C-bit to its shift register when it has completed its transfer of data to the corresponding shift register. If the SoC node has no data to transfer this cycle, the node also sets the C-bit.

When all the C-bits are set, the circular shift register or "wheel" begins to shift or turn incrementally. The rotation in FIG. 2 is shown as clockwise, although either clockwise or counter-clockwise rotation is contemplated by the present arrangement. Each SoC node may then optionally read out the data of the corresponding shift register, so that in M−1 clock cycles each SoC node that is coupled to FEE 15 has had access to the data of each of the other SoC coupled nodes. M is defined as the number of PEs 17 plus the number of MCs 13 that are coupled to FEE 15.

In M clock cycles, the data is back where it originated, and the "wheel" may be thought of as having made a complete turn. After such a complete turn, each of the C-bits is reset, and the corresponding shift registers are cleared. Then the shift registers 31-35 and 41-45 may be re-loaded with data; C-bits are set; and the clock again causes the "wheel" to turn.

As can be seen from the above explanation, the circular register of shift registers 31-35 and 41-45 facilitates data transfer between the FPGA fabric 14 and the PE fabric 16 while rendering transparent data transfer bit width, asynchronous operation, busing and layout of SoC nodes.

Figure 3:
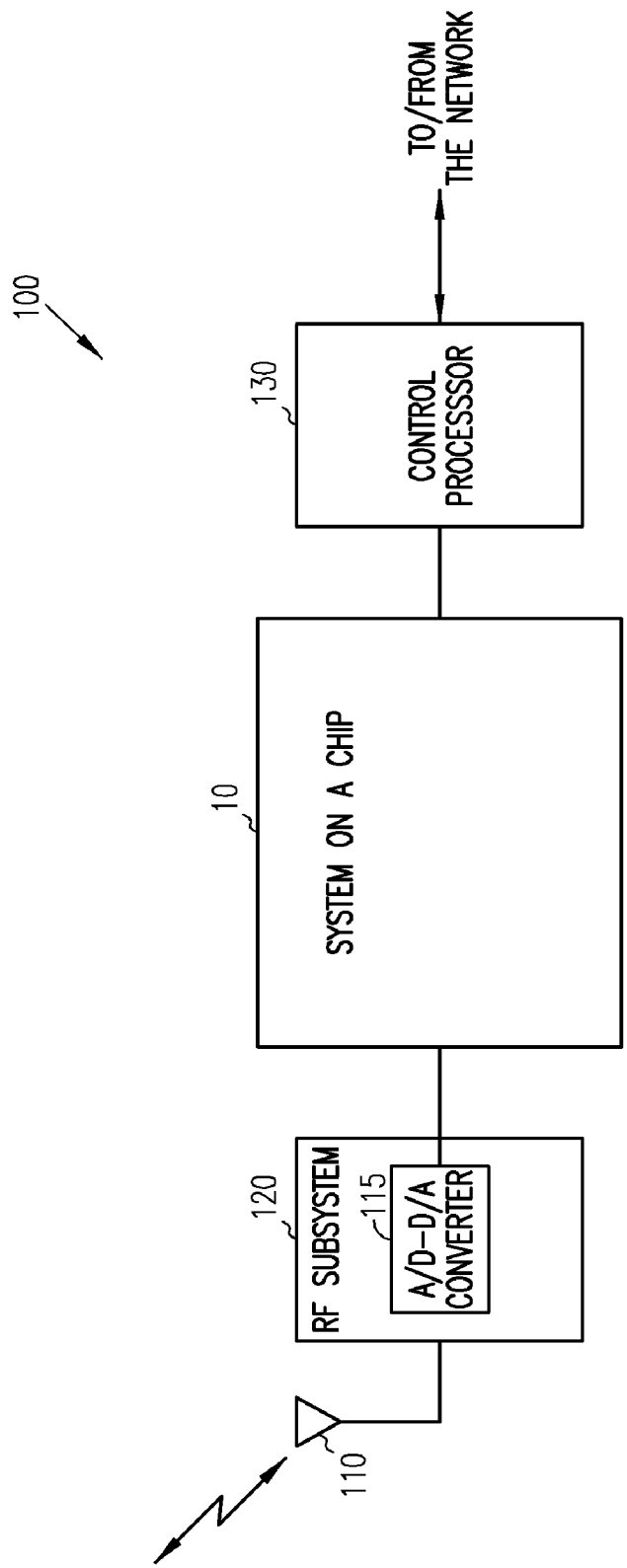
FIG. 3 is a block diagram of an application of a data transfer arrangement in accordance with an embodiment of the present invention.

FIG. 3 is a block diagram of an application of a data transfer arrangement in accordance with an embodiment of the present invention. FIG. 3 is by way of example and does not form any limitation of the scope or applicability of the present data transfer arrangement.

Processing arrangement 100 shows an RF (radio frequency) transmission scheme. Antenna 110 receives incoming or transmits outgoing radio frequency signals and/or data. Antenna 110 may include a directional or omni-directional antenna, including, for example, a dipole antenna, a monopole antenna, a patch antenna, a loop antenna, a microstrip antenna or other type of antenna suitable for reception and/or transmission of data signals. Signals received by antenna 110 are transferred to radio frequency subsystem 120. These received signals are then converted from analog to digital by converter 115. Outgoing signals transmitted by the antenna 110 are converted from digital to analog by converter 115.

These converted signals are then passed to SoC arrangement 10 for processing. System on a Chip 10 converts and processes the data as fast as may be required by any radio frequency application. System on a Chip 10 in an embodiment may utilize a register arrangement, FIFO (first-in-first-out) device, a read/write memory device, buffer, or any kind of parallel (N-bit) store-and-forward arrangement. After the data is processed by System on a Chip 10, the data is forwarded to control processor 130 and on to the network.

Similarly, data from the network is sent to control processor 130 of System on a Chip 10 and processed, as required. The data is then sent through RF subsystem 120, including converter 115, and to antenna 110 for wireless transmission.

As a result of the above-described processing, multiple fabrics of the SoC device or arrangement 10 are easily interfaced. Further, SoC device or arrangement 10 may be implemented on a semiconductor chip 12, such as a System on a Chip 10. System on a Chip arrangement 10 in other embodiments may include a "chip-set". Further the SoC arrangement 10 may be implemented discretely with individual devices.

The SoC device or arrangement 10, in other embodiments, may include a first fabric 14 of elements 13. The elements 13 of first fabric 14 may be logic elements 13 as mentioned above. The SoC device or arrangement 10 may include another fabric 16 of processing elements 17 that require data exchange with the first fabric 14. The processing elements 17 may include processing elements 17 that require data for processing that are contained in the logic elements 13.

To facilitate the transfer of data between the first fabric 14 and the other fabric 17, a data exchanger or fabric exchange element 15 transfers data between the two fabrics 14 and 16. The data exchanger 15 accounts for the processing differences in the two fabrics 14 and 16 while transferring the data in parallel in a timely fashion. For example, these differences may include, but are not limited to, bus size and clock speed.

As mentioned above, first fabric 14 may include a plurality of logic elements 13. The other fabric 17 may include a plurality of processing elements 17.

The data exchanger 15, in an embodiment, can include an N-bit store-and-forward such as a memory, buffer, shift register, or a first-in-first-out device. The store-and-forward device, in some embodiments, includes a plurality of shift registers coupled in a circular arrangement 50 to transfer data to each of the plurality of shift registers 31-35, 41-45. A clock 20, in an embodiment, is coupled to each of the plurality of shift registers 31-35, 41-45 to enable the data to be circulated to each of the plurality of shift registers 31-35, 41-45.

Each shift register 31 of the corresponding plurality of shift registers 31-35, 41-45 has a corresponding bit 51-55, 61-65. Each corresponding bit 51-55, 61-65 indicates that the loading of data into the corresponding shift register 31-35, 41-45 has been completed.

As mentioned above, the semiconductor device 12 may include the System on a Chip 10. The System on a Chip, in an embodiment, may include the two fabrics 14 and 16 and the data exchanger 15.

Figure 4:
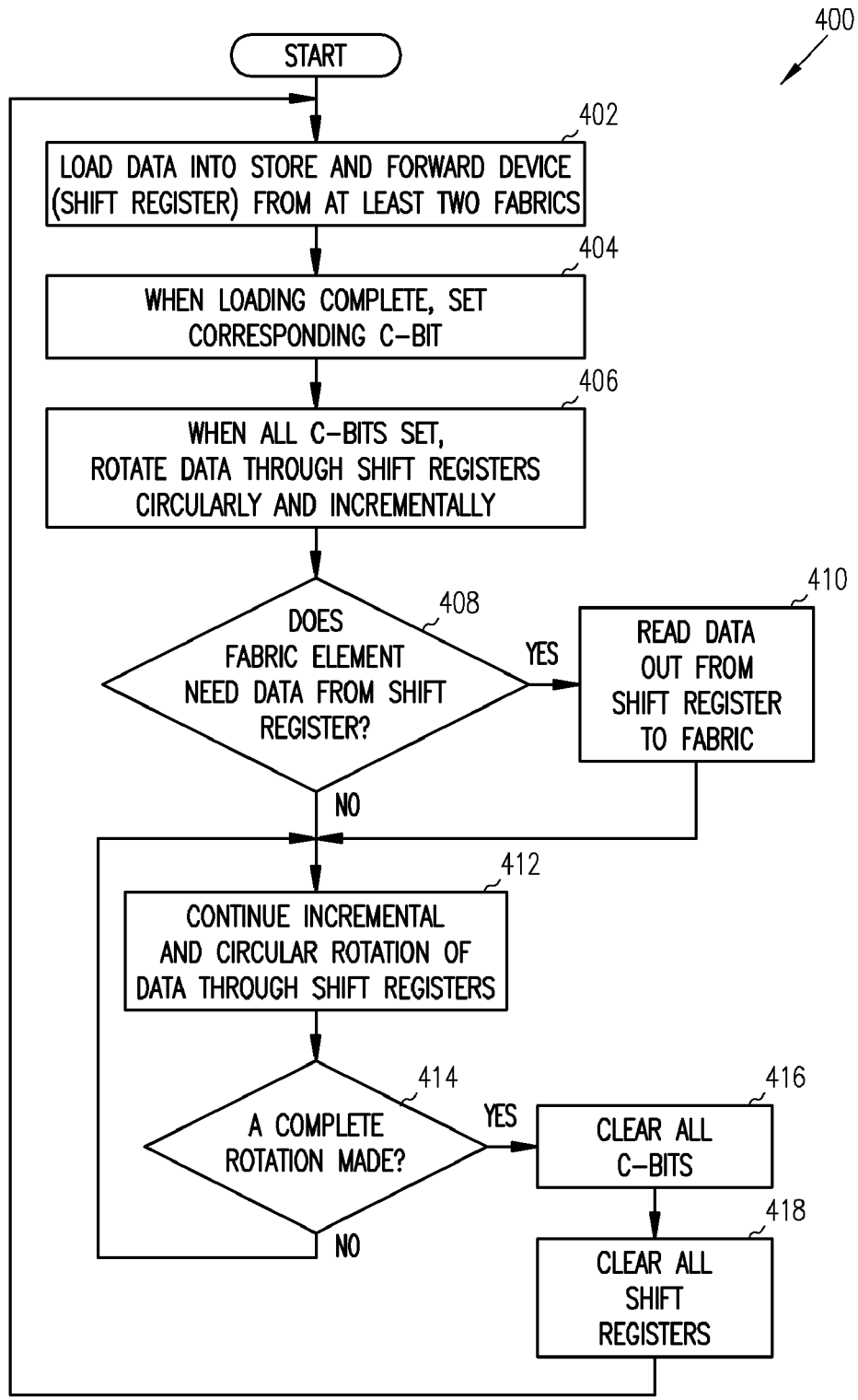
FIG. 4 is a flow chart of a method for data transfer in accordance with an embodiment of the present invention.

FIG. 4 is a flow chart of a method 400 for data transfer in accordance with an embodiment of the present invention. The method 400 is started, and block 402 is entered. Each element 13 and 17 of each fabric 12 and 16, respectively, may load or not load the fabric exchange element 15 with data, block 402. When the loading of each shift register 31-35, 41-45 is completed, in an embodiment, a corresponding C-bit for each shift register 31-35, 41-45 is set, block 404. Even though a shift register 31 has no data, a corresponding C-bit 51 is set, for example.

Block 406 determines when all the C-bits 51-55, 61-65 are set and begins, under control of a clock 20, to cause the plurality of shift registers 31-35, 41-45 to incrementally and circularly rotate the data from one shift register 31 to another shift register 41. Block 408 determines if any fabric element 13 or 17 requires the data now in the corresponding shift register, as the data circularly rotates. If any fabric element 13 or 17 requires the data, block 408 transfers control to block 410 via the YES path. The element 13 or 17 may read the data out of the corresponding shift register, block 406. Block 410 then transfers control to block 412.

If the element 13 or 17 does not require the data presently in its corresponding shift register 31-35, 41-45, then block 408 transfers control to block 412 via the NO path.

The method 400 continues to incrementally and circularly rotate the data through the plurality of circularly-coupled shift registers 31-35, 41-45, block 412. This incremental and circular rotation of the data is controlled by the clock 20. Block 414 determines whether a complete rotation of the data through all of the plurality of shift registers 31-35, 41-45 is completed. If the data has not been rotated through all the shift registers 31-35, 41-45, block 414 transfers control to block 412 via the NO path to continue the incremental and circular rotation of the data through each of the plurality of shift registers 31-35, 41-45.

If block 414 determines that a complete rotation of the data through each of the plurality of shift registers 31-35, 41-45 is completed, then, in an embodiment, block 414 transfers control to block 416 via the YES path.

The method, in block 416, clears all the C-bits 51-55, 61-65 of the corresponding shift registers 31-35, 41-45. All of the shift registers 31-35, 41-45 are cleared in block 418. Block 418 transfers control to block 402 to begin method 400 again for the transfer of data between different fabrics 14 and 16.

The method 400 allows for the efficient transfer of data among different fabrics of elements.

The description and the drawings illustrate specific embodiments of the invention sufficiently to enable those skilled in the art to practice them. Examples merely typify possible variations. Portions and features of some embodiments may be included in or substituted for those of others.

Although some embodiments of the invention have been illustrated and described in detail, it will be readily apparent to those skilled in the art that various modifications may be made therein without departing from the spirit of these embodiments or from the scope of the appended claims.

What is claimed is:

1. A data transfer arrangement comprising:
   a plurality of logic elements, the plurality of logic elements including a plurality of macro cells;
   a plurality of processing elements;
   a transfer element to transfer data in parallel between each logic element of the plurality of logic elements and each processing element of the plurality of processing elements, the transfer element including a circular shift register including a plurality of shift registers coupled in parallel in a circular arrangement,
   each shift register of the plurality of shift registers including a shift register of N bits,
   each shift register of the plurality of shift registers having a corresponding bit associated with such shift register, the corresponding bit to indicate that loading of data into such shift register has been completed,
   the plurality of shift registers including a first portion coupled to the plurality of macro cells, and a second portion coupled to the plurality of processing elements, the first and the second portions of the plurality of shift registers including a plurality of shift registers of N bits; and
   a clock to produce clock cycles, the clock coupled to the first portion and to the second portion of the plurality of shift registers, each shift register to transmit N bits of data to a next shift register in the circular shift register during a clock cycle, the clock operating to clear the corresponding bit for each of the corresponding shift registers of the plurality of shift registers, after M clock cycles, where M is a number of processing elements plus macro cells being coupled to the transfer element.

2. The data transfer arrangement as claimed in claim 1, further including a first shift register of the second portion of shift registers coupled to a last shift register of the first portion of shift registers.

3. The data transfer arrangement as claimed in claim 1, further including a first shift register of the first portion of shift registers coupled to a last shift register of the second portion of shift registers.

4. The data transfer arrangement as claimed in claim 1, wherein there is further included a System on a Chip, the System on a Chip including:
   the plurality of logic elements;
   the plurality of processing elements; and
   the transfer element.

5. A semiconductor device comprising:
    a first fabric of elements, including a plurality of logic elements;
    a second fabric of elements, including a plurality of processing elements;
    a data exchanger to transfer data in parallel between the first fabric of elements and the second fabric of elements, the first fabric and the second fabric being data incompatible, the data exchanger including an N-bit parallel store-and-forward device, the N-bit store-and-forward device including a plurality of N-bit shift registers coupled in a circular arrangement,
        each shift register of the plurality of shift registers having a corresponding bit associated with such shift register, the corresponding bit to indicate that loading of data into such shift register has been completed,
        the plurality of shift registers including a first portion coupled to the plurality of macro cells, and a second portion coupled to the plurality of processing elements, the first and the second portions of the plurality of shift registers including a plurality of shift registers of N bits; and
    a clock to produce clock cycles, the clock coupled to the first portion and to the second portion of the plurality of shift registers, each shift register to transmit N bits of data to a next shift register in the circular shift register during a clock cycle, the clock operating to clear the corresponding bit for each of the corresponding shift registers of the plurality of shift registers, after M clock cycles, where M is a number of processing elements plus macro cells being coupled to the transfer element.

6. The semiconductor device as claimed in claim 5, wherein the semiconductor device further includes a System on a Chip, the System on a Chip including:
    the first fabric of elements;
    the second fabric of elements; and
    the data exchanger.

7. A method comprising:
    loading data by a first fabric of elements and a second fabric of elements into a store-and-forward device;
    when the loading of each of a plurality of shift registers of the store-and-forward device is completed, setting a C-bit corresponding to each of the plurality of shift registers;
    when the C-bit of each of the corresponding plurality of shift registers is set, circularly and incrementally transferring the data through the store-and-forward device to allow each element of the first and second fabrics to access the data of other elements of the first and second fabrics;
    determining by the elements if the data is needed by the element;
    if the data is needed, reading the data from the store-and-forward device by an element from the other elements of the first and second fabrics;
    determining if the circular transferring of the data is completed; and
    if the circular transferring of the data is complete, clearing each C-bit, and clearing the data from each of the plurality of shift registers.

8. A system comprising:
    a System on a Chip including
        a plurality of logic elements, the plurality of logic elements including a plurality of macro cells;
        a plurality of processing elements;
        a transfer element to transfer data in parallel between each logic element of the plurality of logic elements and each processing element of the plurality of processing elements, the transfer element including a circular shift register including a plurality of shift registers coupled in parallel in a circular arrangement,
            each shift register of the plurality of shift registers including a shift register of N bits,
            each shift register of the plurality of shift registers having a corresponding bit associated with such shift register, the corresponding bit to indicate that loading of data into such shift register has been completed,
            the plurality of shift registers including a first portion coupled to the plurality of macro cells, and a second portion coupled to the plurality of processing elements, the first and the second portions of the plurality of shift registers including a plurality of shift registers of N bits; and
        a clock to produce clock cycles, the clock coupled to the first portion and to the second portion of the plurality of shift registers, each shift register to transmit N bits of data to a next shift register in the circular shift register during a clock cycle, the clock operating to clear the corresponding bit for each of the corresponding shift registers of the plurality of shift registers, after M clock cycles, where M is a number of processing elements plus macro cells being coupled to the transfer element;
    a radio-frequency subsystem coupled to the System on a Chip; and
    an omni-directional antenna coupled to the radio-frequency subsystem.

9. The system as claimed in claim 8, further including:
    a first shift register of the second portion of shift registers coupled to a last shift register of the first portion of shift registers.

10. The system as claimed in claim 8, further including
    a first shift register of the first portion of shift registers coupled to a last shift register of the second portion of shift registers.

* * * * *

UNITED STATES PATENT AND TRADEMARK OFFICE
CERTIFICATE OF CORRECTION

PATENT NO.        : 7,570,611 B2
APPLICATION NO. : 11/026547
DATED             : August 4, 2009
INVENTOR(S)      : Alan Stone It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Seventh Day of September, 2010

David J. Kappos
*Director of the United States Patent and Trademark Office*